Oct. 15, 1963  G. R. DEMPSTER ETAL  3,107,021
VEHICLE BODY LOADING AND UNLOADING MECHANISMS
Filed May 7, 1959  3 Sheets-Sheet 3

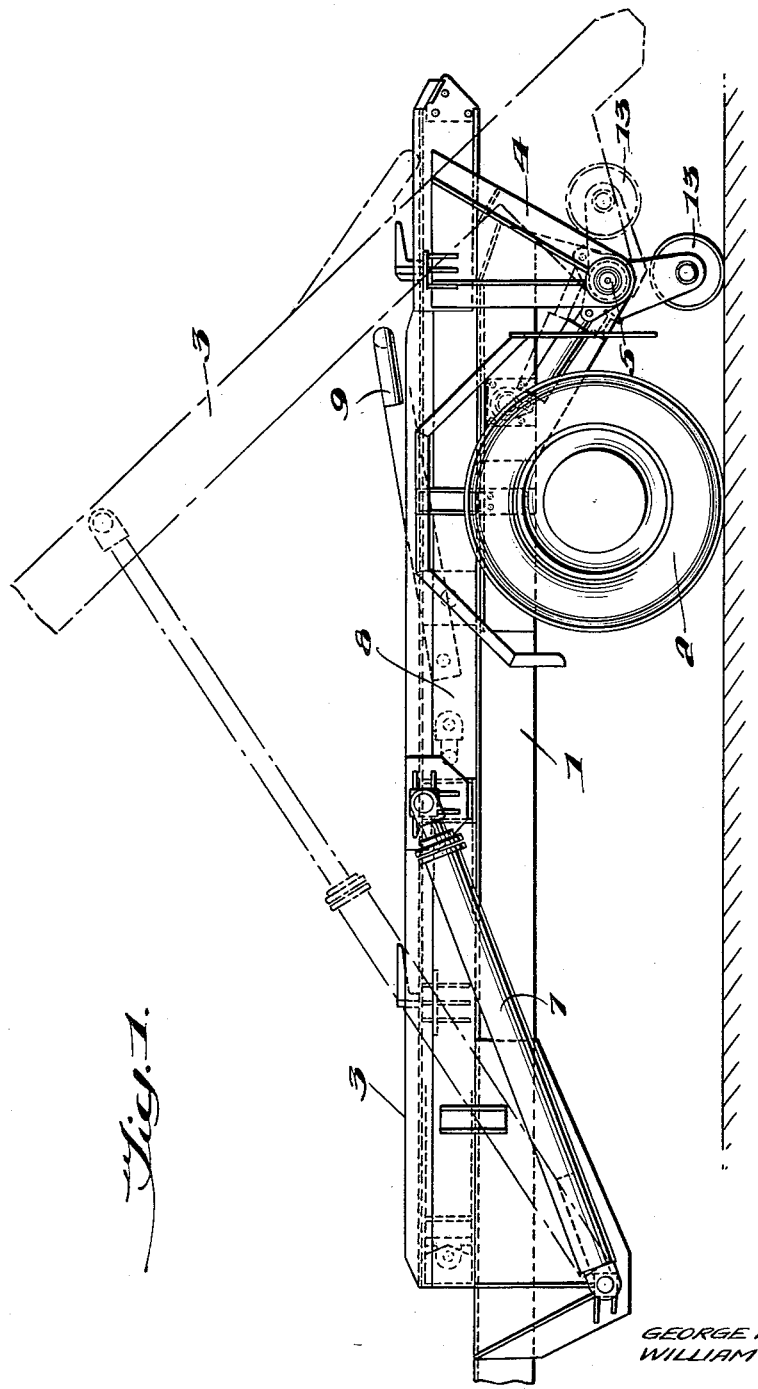

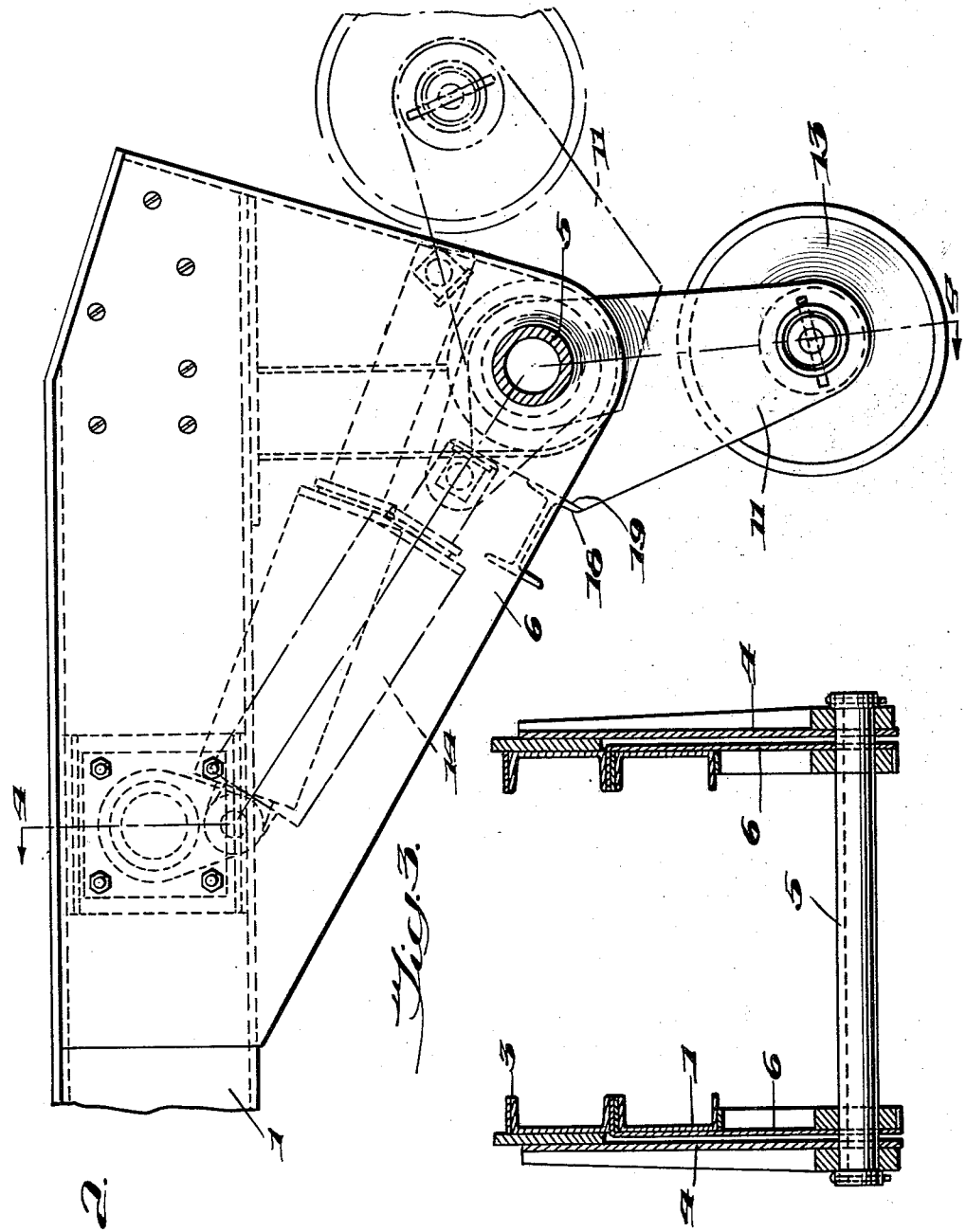

INVENTORS
GEORGE R.
DEMPSTER,
WILLIAM A.
HERPICH,
BY
Ameshen & Mathis
ATTORNEYS

United States Patent Office 3,107,021
Patented Oct. 15, 1963

3,107,021
VEHICLE BODY LOADING AND UNLOADING MECHANISMS
George R. Dempster and William A. Herpich, Knoxville, Tenn.; said Herpich assignor to Dempster Brothers, Inc., a corporation of Tennessee
Filed May 7, 1959, Ser. No. 811,657
6 Claims. (Cl. 214—505)

This invention relates to improvements in vehicle body loading and unloading mechanisms and more particularly to stabilizing jack assemblies for such mechanisms.

It is often desirable to use large capacity containers of the order of vehicle bodies and to load and unload such containers with respect to the transport vehicles, separable therefrom. Such containers can be filled when sitting on the ground, floor or other surface, after which they can be picked up and loaded by power, transported to a remote point and then set down off the vehicle or unloaded.

Where the container is moved lengthwise onto or off the bed of the vehicle or chassis frame thereof, especially where heavy lading is involved, the weight of the loaded body or container imposes a substantial tipping action to the rear end portion of the vehicle chassis. Various attempts have been made heretofore to provide a stabilizing jack for supporting the chassis at the rear during loading or unloading of a container with respect thereto. Such attempts have not been satisfactory, especially for heavy loads, because of the lightness of construction and the insecureness of mounting.

One object of this invention is to improve the construction of a stabilizing jack assembly, to be used on the rear of a vehicle chassis for supporting and holding the rear portion thereof during loading or unloading of a container with respect thereto.

Another object of the invention is to provide a stabilizing jack assembly of sturdy and rigid construction mounted on the rear end portion of a supporting frame for a container, which can be shifted by power into and out of supporting position beneath the frame.

These objects may be accomplished, according to one embodiment of the invention, by providing a leg structure pivotally supported on a frame of the vehicle for swinging movement into and out of supporting position. The leg structure preferably includes a roller adapted to be moved into engagement with the ground surface for supporting relation to the frame when the leg structure is turned to an upright position. Power means is preferably employed for moving the leg structure into and out of supporting position, such, for example, as a hydraulic power device.

This embodiment of the invention is illustrated in the accompanying drawings, in which:

FIG. 1 is a side elevation of a portion of the vehicle chassis and the tilting frame for the container and showing the stabilizing jack assembly mounted thereon;

FIG. 2 is an enlarged side elevation of the rear end portion of the tilting frame and showing the stabilizing jack assembly;

FIG. 3 is a vertical section through the tilting frame support with parts omitted;

The invention is illustrated as applied to vehicle loading and unloading mechanism of the character set forth in our prior application, Serial No. 800,320, filed March 18, 1959.

The invention is shown as illustrated in connection with a motor vehicle chassis of conventional form wherein the chassis frame is indicated generally at 1 and is supported by the usual wheels 2, power driven under control of an operator from a suitable source of power on the vehicle. The chassis frame is usually of sufficient length to accommodate a separable vehicle or container.

Figure 4:
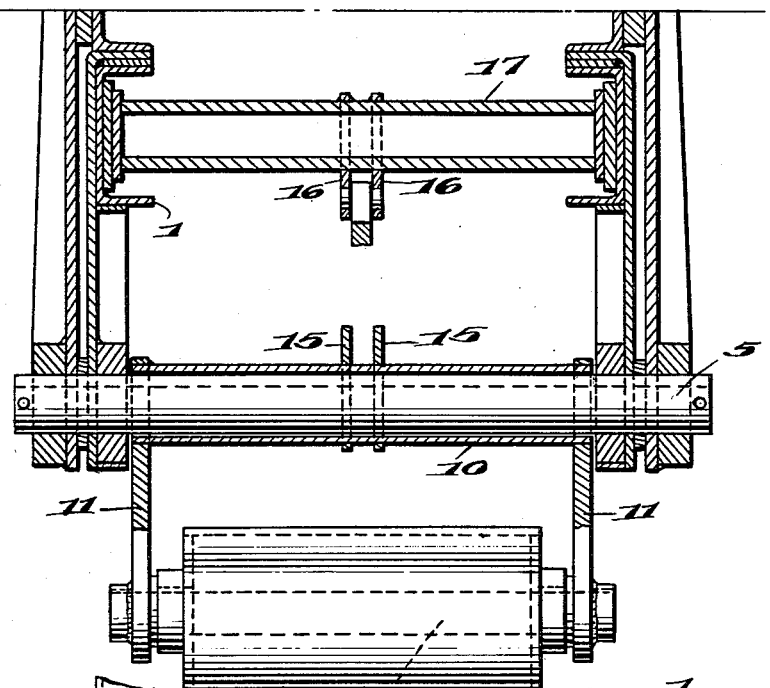
FIG. 4 is a vertical cross section on the line 4—4 in FIG. 2.

Mounted on the chassis frame 1 is a tilting frame 3 of a size and character to be disposed directly over the chassis frame 1, as shown in FIGS. 3 and 4, and preferably extending throughout the major portion of the length of the chassis frame. The tilting frame 3 is provided with depending supporting brackets 4 on the rear end thereof, which are pivotally mounted on a journal rod or pivot member 5 extending transversely between and supported by a pair of plate brackets 6 that depend from the rear end portion of the chassis frame 1, as shown more in detail in FIGS. 2 and 3.

The tilting frame 3, thus mounted on the journal rod 5, is capable of swinging movement between the full line and dotted line positions shown in FIG. 1. Such movement of the tilting frame 3 may be accomplished by power devices mounted on the vehicle chassis and connected with the tilting frame, and which devices are illustrated as hydraulic cylinders 7, shown in FIG. 1, and located on opposite sides of the chassis.

The tilting frame 3 is provided with means for loading and unloading a container or separable body. Such means may include a carriage, generally indicated at 8 in FIG. 1, operatively mounted on the tilting frame 3 for reciprocating movement lengthwise thereof. Connected with the carriage 8 is a bail 9 adapted for connection with a suitable part of the container or separable body to move the latter onto or off the tilting frame 3. Such movement may be accomplished either when the tilting frame 3 is in the inclined position shown in dotted lines in FIG. 1, especially when the container is sitting on the ground, with the bottom of the container substantially at ground level, or, if the container is sitting on an elevated dock, platform or legs, it may be moved onto or off the tilting frame substantially in a horizontal position of the latter. This action has been described more fully in our prior application, Serial No. 800,320.

Provision is made, according to this invention, for stabilizing the rear end portion of the vehicle chassis during loading or unloading of the container. This stabilizing jack assembly preferably is suspended from the journal rod 5 and is power operated, so as to be moved to a supporting position beneath the rear end portion of the chassis frame whenever desired.

Sleeved over the journal rod 5 is a tubular section 10 from which leg links 11 are suspended and are secured rigidly to the section 10, as by welding. The lower ends of the links 11 are connected together by a shaft 12 on which a roller 13 is journaled. Any other suitable pivotal support, in place of the journal rod 5 for the tilting frame, may be used as a pivotal support for the links 11 of the jack assembly.

Figure 5:
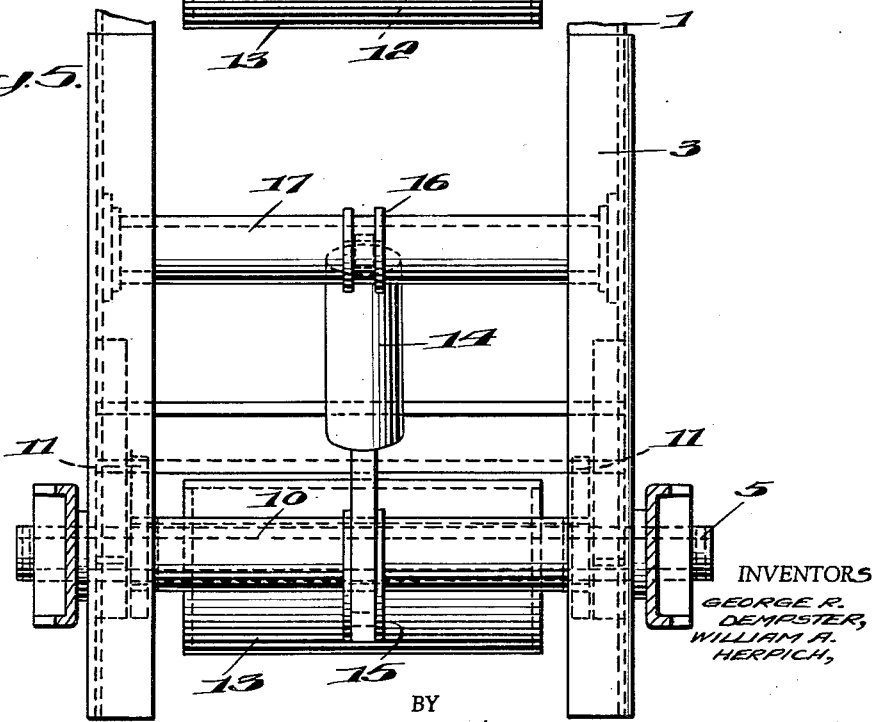
FIG. 5 is a top plan view thereof.

The roller 13 is capable of swinging movement on the leg links 11 between the positions shown in full lines and in dotted lines in FIGS. 1 and 2, being moved into and out of supporting positions, as desired. Such movement is accomplished preferably by a hydraulic power device 14. The hydraulic power device or cylinder 14 is connected at one end through ears 15 fixed on the tubular section 10 that is journaled on the journal rod 5, so as to impart rotary movement to the tubular section for swinging the leg links 11 and the roller 13 about the axis of the journal rod 5. The opposite end of the cylinder 14 is pivotally connected with ears 16 that are fixed to a cylinder mounting tube 17 extending transversely between the opposite members of the chassis frame 1 to which this tube 17 is secured, as illustrated in FIGS. 4 and 5.

The hydraulic cylinder 14 is supplied with power from the hydraulic source on the vehicle under control of the operator in the cab in the usual manner of controlling hydraulic cylinders.

The cylinder is normally contracted, holding the roller 13 in the position shown in dotted lines in FIGS. 1 and 2. However, when the cylinder 14 is expanded, this causes rotary movement of the section 10 with respect to the journal rod 5, thereby swinging the leg links 11 and the roller 13 down to the full line positions shown in FIGS. 1 and 2, where this roller will be in a position substantially at ground level. The roller will be located with its axis substantially in the vertical plane through the journal rod 5, so as to impart the maximum supporting force to the rear end portion of the vehicle chassis directly thereover. The roller is limited in its swinging movement by an abutment member 18 which extends transversely betwen the side brackets 6 and is welded thereto. This abutment member 18 is in position to be engaged by shoulders 19 provided on the rear edge portions of the leg links 11 when the cylinder 14 has reached its full stroke. This abutment member 18 is not required ordinarily as a stop for the swinging of the jack assembly, which is normally controlled by the cylinder 14 in its respective positions.

The stabilizing jack assembly operates independently of the tilting frame 3 and it is possible to raise or lower the stabilizing jack assembly whether or not the tilting frame is raise or lowered. Under normal conditions, when picking up from or pushing off to the ground, the tilting frame 3 would be in the dotted line position shown in FIG. 1, while the stabilizing jack would be in position shown in full lines in FIG. 1. However, when pushing off to or picking up from a flat car, the tilting frame 3 would be in the full line position, and the stabilizing jack also would be in the full line position. In both cases, it is recommended that the stabilizing jack be in the down or operating position, to prevent the truck from pivoting around the rear axle and possibly raising the front wheels of the truck off the ground during the loading or unloading operation.

A secure and effective stabilizing assembly is provided which will afford secure support at the rear end of the chassis and with a very simple and inexpensive construction that may be sturdily built and applied readily to the equipment.

While the invention has been illustrated and described in one embodiment, it is recognized that variations and changes may be made therein without departing from the invention, as set forth in the claims.

We claim:

1. In vehicle body loading and unloading mechanism of the character described, the combination with a motor vehicle chassis including a chassis frame, a tilting frame mounted over the chassis frame and adapted to receive a container thereon, brackets connected respectively with the tilting frame and chassis frame, a journal rod pivotally connecting the tilting frame brackets with the chassis frame brackets and forming a pivotal support for the tilting frame on the chassis frame, leg links mounted on the journal rod for swinging movement relative thereto, a shaft connecting together the leg links, a roller journaled on the shaft, and power means for swinging the leg links and the roller to operative and inoperative positions.

2. In vehicle body loading and unloading mechanism of the character described, the combination with a motor vehicle chassis including a chassis frame, a tilting frame mounted over the chassis frame and adapted to receive a container thereon, brackets connected respectively with the tilting frame and chassis frame, a journal rod pivotally connecting the tilting frame brackets with the chassis frame brackets and forming a pivotal support for the tilting frame on the chassis frame, leg links mounted on the journal rod for swinging movement relative thereto, a shaft connecting together the leg links, a roller journaled on the shaft, a hydraulic cylinder connected at one end with the leg links, and means connecting the hydraulic cylinder at the opposite end with the chassis frame for causing swinging movement of the leg links and the roller to operative and inoperative positions.

3. In vehicle body loading and unloading mechanism of the character described, the combination with a motor vehicle chassis including a chassis frame, a tilting frame mounted over the chassis frame and adapted to receive a container thereon, brackets connected respectively with the tilting frame and chassis frame, a journal rod pivotally connecting the tilting frame brackets with the chassis frame brackets and forming a pivotal support for the tilting frame on the chassis frame, leg links journaled on the journal rod for swinging movement relative thereto, a shaft connecting together the leg links, a roller journaled on the shaft, power means for swinging the leg links and the roller to operative and inoperative positions, said leg links having shoulders thereon, and abutments secured to the chassis frame in the path of movement of the shoulders for limiting the swinging movements of the leg links in one direction.

4. In a vehicle body loading and unloading mechanism of the character described, the combination with a vehicle chassis including a chassis frame having a pair of running wheels toward its rear, of a tilting frame supported on the vehicle chassis and extending throughout the major portion of the length of said chassis frame, said tilting frame being adapted to receive a container thereon, means pivotally mounting the tilting frame for vertical swinging movement about its rear end and relative to the vehicle chassis, said pivot means including a journal rod fixed to the chassis frame rearwardly of said rear running wheels, a stabilizing jack assembly pivotally mounted on said journal rod, said jack assembly including a tubular member sleeved over said rod and journaled thereon, a pair of spaced leg links connected at one end rigidly with the tubular member, a shaft connected with the opposite ends of said leg links, a roller journaled on said shaft, and power means connected intermediate the length of said tubular member and to the chassis frame for swinging the jack assembly into and out of engagement with the ground.

5. In a vehicle body loading and unloading mechanism of the character described, the combination with a vehicle chassis including a chassis frame having a pair of running wheels toward its rear end, of a tilting frame supported on the vehicle chassis and extending throughout the major portion of the length of said chassis frame, said tilting frame being adapted to receive a container thereon, means pivotally mounting the tilting frame for vertical swinging movement about its rear end and relative to the vehicle chassis, said pivot means including a journal rod fixed to the chassis frame and positioned a substantial distance rearwardly of said running wheels, a stabilizing jack assembly pivotally mounted on said journal rod, said jack assembly including a tubular member sleeved over said rod and journaled thereon, a pair of spaced leg links connected at one end rigidly with the tubular member, a shaft rigidly connected with the opposite ends of said leg links, a roller journaled on said shaft, and power means connected intermediate the length of said tubular member and to the chassis frame for swinging the jack assembly into and out of engagement with the ground.

6. In a vehicle body loading and unloading mechanism of the character described, the combination with a vehicle chassis including a chassis frame having a pair of running wheels toward its rear end, of a tilting frame supported on the vehicle chassis and extending throughout the major portion of the length of said chassis frame, said tilting frame being adapted to receive a container thereon, means pivotally mounting the tilting frame for vertical swinging movement about its rear end and relative to the vehicle chassis, power means for swinging said tilting frame, said power means pivoted to the chassis frame adjacent the front end of the tilting frame when horizontal, the opposite end of said power means being pivoted to the tilting frame at a point thereon toward the middle of the length thereof, said pivot means including a journal rod fixed to the chassis frame rearwardly of said running wheels, a stabilizing jack assembly pivotally mounted on said journal rod, said jack assembly including a tubular member sleeved over said rod and journaled thereon, a pair of spaced leg links connected at one end rigidly with the tubular member, a shaft rigidly connected with the opposite ends of said leg links, a roller on said shaft, and power means connected intermediate the length of said tubular member and to the chasssis frame for swinging the jack assembly into and out of engagement with the ground.

References Cited in the file of this patent

UNITED STATES PATENTS

| | | |
|---|---|---|
| 1,943,196 | Ward | Jan. 9, 1934 |
| 2,308,648 | De Vry et al. | Jan. 19, 1943 |
| 2,431,245 | Haig et al. | Nov. 18, 1947 |
| 2,439,085 | Grzech et al. | Apr. 6, 1948 |
| 2,741,383 | Leckert | Apr. 10, 1956 |
| 2,745,566 | Bouffard | May 15, 1956 |
| 2,997,343 | MacKinney et al. | Aug. 22, 1961 |

FOREIGN PATENTS

| | | |
|---|---|---|
| 309,375 | Switzerland | Nov. 1, 1955 |